United States Patent [19]

Son et al.

[11] Patent Number: 5,446,360
[45] Date of Patent: Aug. 29, 1995

[54] METHOD AND APPARATUS FOR CONTROLLING SINGLE PHASE INDUCTION MOTOR

[75] Inventors: Byung-Soo Son; Lee-Kyung Kim, both of Seoul, Rep. of Korea

[73] Assignee: Samsung Electronics Co., Ltd., Suwon, Rep. of Korea

[21] Appl. No.: 107,152

[22] Filed: Aug. 17, 1993

[30] Foreign Application Priority Data

Aug. 17, 1992 [KR] Rep. of Korea .................. 92-14759

[51] Int. Cl.⁶ .................................................. H02P 1/24
[52] U.S. Cl. ........................................ 318/727; 318/811; 318/561; 318/560
[58] Field of Search ............... 318/811, 561, 727, 560, 318/774, 798, 799

[56] References Cited

U.S. PATENT DOCUMENTS

| | | | |
|---|---|---|---|
| 4,713,596 | 12/1987 | Bose | 318/561 |
| 4,967,134 | 10/1990 | Losic et al. | 318/811 |
| 4,990,001 | 2/1991 | Losic et al. | 318/811 |
| 5,013,998 | 5/1991 | Varga et al. | 318/811 |

Primary Examiner—William M. Shoop, Jr.
Assistant Examiner—Karen Masih
Attorney, Agent, or Firm—Burns, Doane, Swecker & Mathis

[57] ABSTRACT

A method and an apparatus for controlling a single phase induction motor. The method comprises the step of calculating an error between an ideal position signal from a reference model and a position signal of the motor detected by a position detecting circuit as the motor is controlled, and the step of converting the error calculated at the previous step into a control coefficient on the basis of an adaptive rule and then controlling the motor according to the control coefficient. The apparatus comprises an AC zero crossing detecting circuit for detecting a crossing point of an AC voltage being applied to the motor, a position detecting circuit for detecting a rotation of the motor, a memory for storing an adaptive rule program based on a speed characteristic of the motor, a microcomputer for calculating a rotation speed of the motor in response to output signals from the AC zero crossing and position detecting circuits and generating a phase angle control signal according to the calculated speed and the adaptive rule program stored in the memory, and a driving circuit for controlling the rotation speed of the motor in response to the phase angle control signal, Therefore, an overshoot at the start of the motor and an error at a steady state thereof can be minimized, resulting in the output of a smooth speed at a transient state.

8 Claims, 3 Drawing Sheets

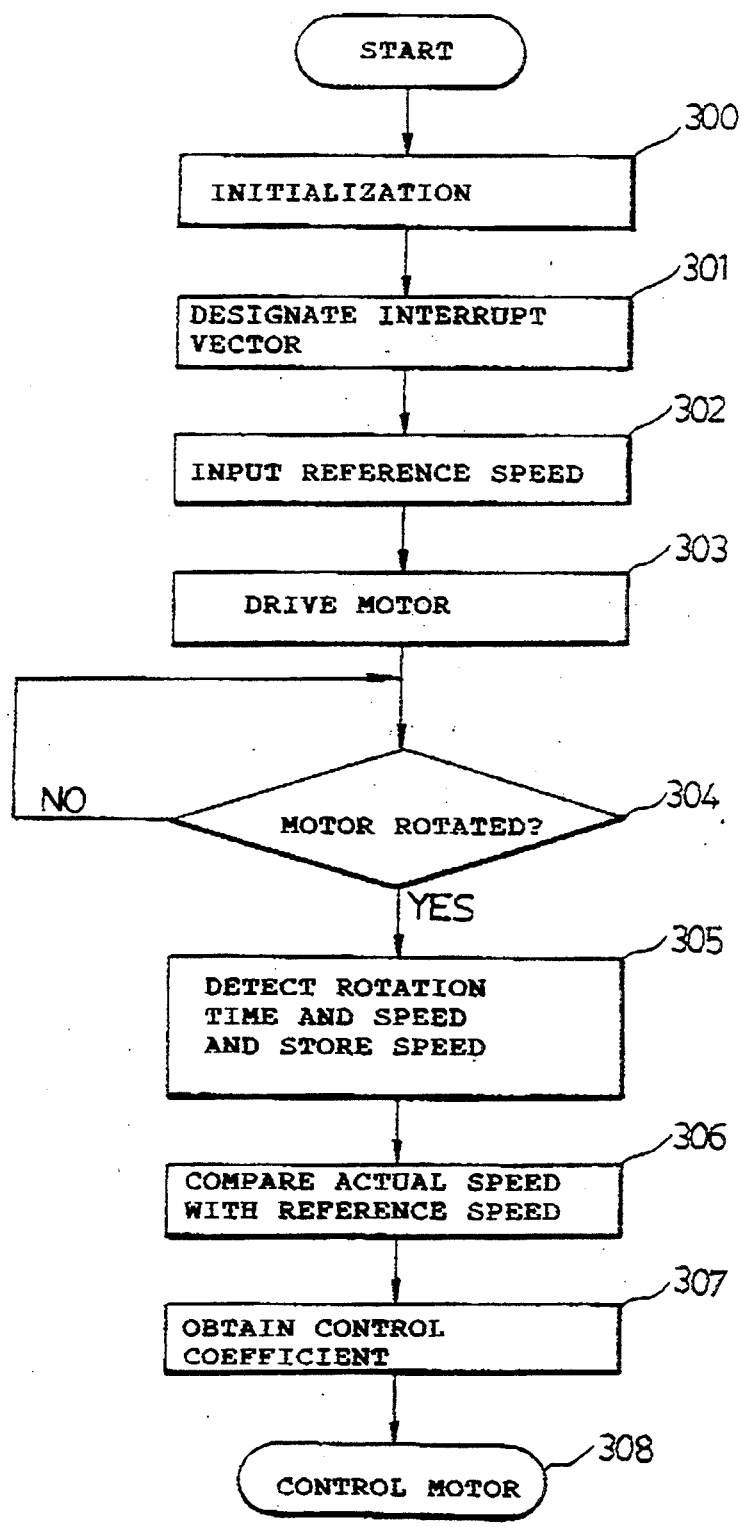

METHOD AND APPARATUS FOR CONTROLLING SINGLE PHASE INDUCTION MOTOR

BACKGROUND OF THE INVENTION

Field of the Invention

The present invention relates in general to the control of single phase induction motors which are mainly used in household electric appliances, and more particularly to a method and an apparatus for controlling a single phase induction motor, in which the single phase induction motor is controlled in an adaptive control manner so that an overshooting at the start of the motor and errors at a steady state thereof can be minimized, resulting in the output of a smooth speed at a transient state.

Description of the Prior Art

Generally, a single phase induction motor has most widely been used in household electric appliances since it has a simple construction and is low in price and home power is of a single phase. In such a single phase induction motor, a starting torque must be forced to be generated because no torque is generated in a rotor at the stop of the rotor in that current flows through rotor bars due to an alternating field resulting from an alternating current (AC) voltage in a winding of a stator; however, the stator and the rotor are aligned in their axis.

The single phase induction motor may conventionally be classified into split phase start, condenser start, shading coil induction motors and etc. according to the starting type. These single phase induction motors have the disadvantage that the accurate control thereof is very difficult at the start thereof since the starting torque is compulsorily generated as mentioned above.

In particular, it is very hard to model the single phase induction motor, particularly in the case of low speed, as compared with a direct current (DC) motor, which is an important factor in making the accurate control difficult. For this reason, most of the single phase induction motors applied to the household electric appliances have recently been controlled in a simple ON/OFF control manner or a PDI control manner for more accurate control. For the purpose of making the performance of the single phase induction motor better, the speed of the motor is controlled, being considerably subdivided into various steps. For example, in the PDI control manner, a PDI coefficient is obtained on the basis of an angular velocity. Even in this case, however, the control of the single phase induction motor is difficult at a transient state because it is impossible to remove an overshoot at the start of the motor and an error at a steady state thereof.

SUMMARY OF THE INVENTION

Therefore, the present invention has been made in view of the above problems, and it is an object of the present invention to provide a method and an apparatus for controlling a single phase induction motors in which the single phase induction motor is controlled in such an adaptive control manner as to set an ideal transfer function analogous to that of the motor mathematically as a reference model and then allow a position or a speed of the motor to follow the reference model, so that overshooting at the start of the motor and errors at a steady state thereof can be minimized, resulting in the output of a smooth speed at a transient state.

In accordance with one aspect of the present invention, there is provided a method of controlling a single phase induction motor, comprising the steps of: (a) calculating an error between an ideal position signal from a reference model and a position signal of the motor detected by a position detecting circuit as the motor is controlled: and (b) converting the error calculated at the step (a) into a control coefficient on the basis of an adaptive rule and then controlling the motor according to the control coefficient.

In accordance with another aspect of the present invention, there is provided an apparatus for controlling a single phase induction motor, comprising: AC zero crossing detecting means for detecting a crossing point of an AC voltage being applied to the motor; position detecting means for detecting a rotation of the motor; storage means for storing an adaptive rule program based on a speed characteristic of the motor; control means for calculating a rotation speed of the motor in response to output signals from said AC zero crossing detecting means and said position detecting means and generating a phase angle control signal according to the calculated speed and the adaptive rule program stored in said storage means; and driving means for controlling the rotation speed of the motor in response to the phase angle control signal from said control means.

BRIEF DESCRIPTION OF THE DRAWINGS

The above and other objects, features and advantages of the present invention will be more clearly understood from the following detailed description taken in conjunction with the accompanying drawings, in which:

FIG. 3 is a flowchart illustrating a method of controlling the single phase induction motor in accordance with the present invention.

DETAILED DESCRIPTION OF THE INVENTION

Figure 1:
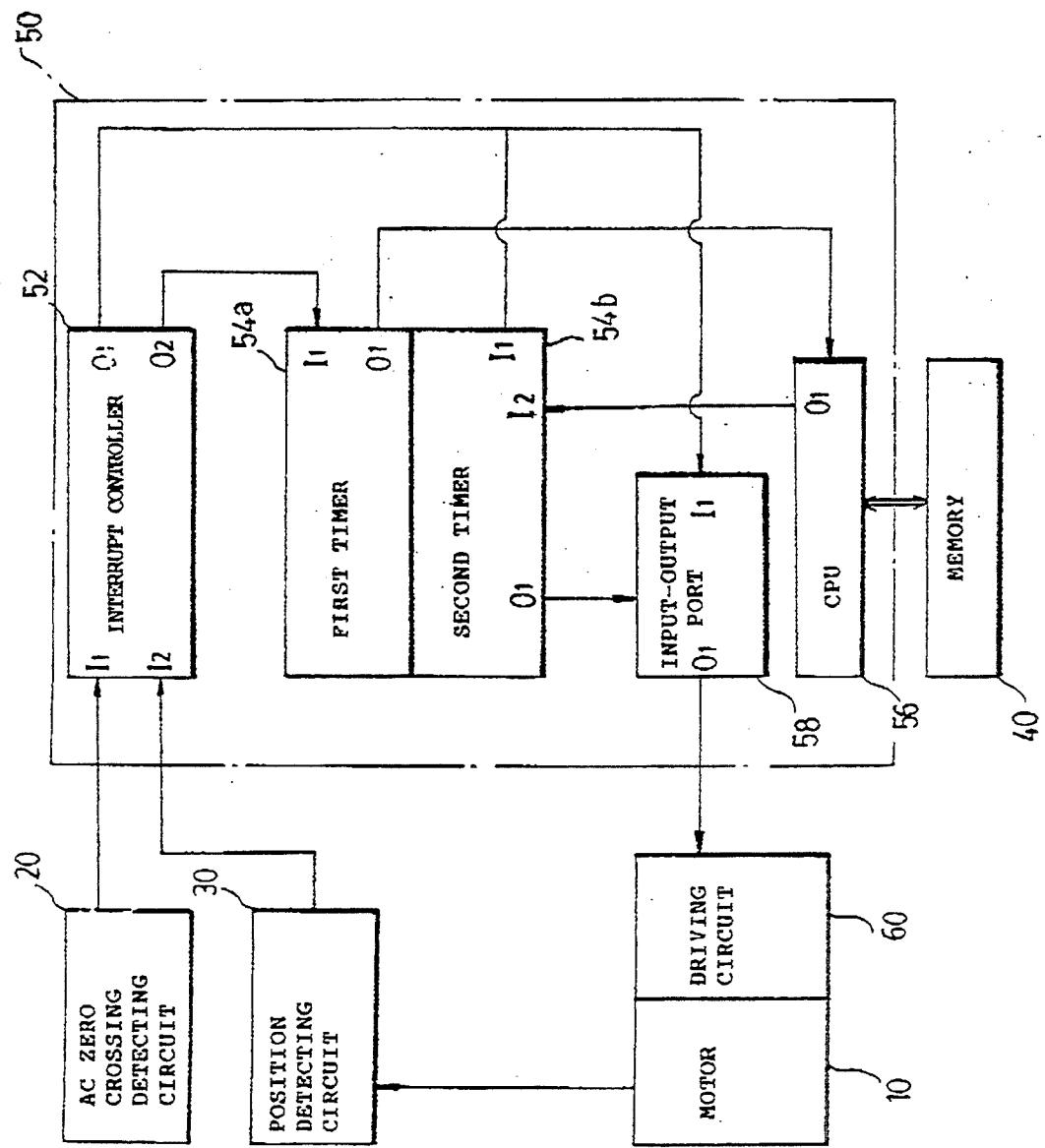
FIG. 1 is a block diagram of an apparatus for controlling a single phase induction motor in accordance with the present invention.

Referring to FIG. 1, there is shown a block diagram of an apparatus for controlling a single phase induction motor in accordance with the present invention. As shown in this figure, the single phase induction motor control apparatus of the present invention comprises an AC zero crossing detecting circuit 20 for detecting a 120 Hz crossing point of an AC voltage being applied to the motor 10. A position detecting circuit 30 is provided for detecting N output pulses per rotation from the motor 10. A memory 40 is provided for storing an adaptive rule program based on a speed characteristic of the motor 10. A microcomputer 50 is provided for calculating a rotation speed of the motor 10 in response to output signals from the AC zero crossing detecting circuit 20 and position detecting circuit 30 and generating a phase angle control signal according to the calculated speed and the adaptive rule program stored in the memory 40. A driving circuit 60 is provided for controlling the rotation speed of the motor 10 in response to the phase angle control signal from the microcomputer 50.

The microcomputer 50 includes an interrupt controller 52 interrupted in response to the output signal from the AC zero crossing detecting circuit 20 for outputting a zero crossing signal at its output terminal O1. The interrupt controller 52 is also interrupted in response to the output signal from the position detecting circuit 30 for performing an interrupt service routine to count the output signals from the position detecting circuit 30 and then output a desired signal at its output terminal O2 when the counted value is N.

A first timer 54a is also provided in the microcomputer 50 to output the time per rotation at its output terminal O1 in response to the desired signal from the output terminal O2 of the interrupt controller 52.

A CPU 56 is also provided in the microcomputer 50 to calculate the rotation speed of the motor 10 on the basis of the time per rotation from the output terminal O1 of the first timer 54a and generate a motor control signal by performing an adaptive process of the calculated speed on the basis of the adaptive rule program stored in the memory 40.

A second timer 54b is also provided in the microcomputer 50 to convert the motor control signal from the CPU 56 into a count and output the phase angle control signal of logical "1" bits by the count through an I/O port 58 to the driving circuit 60 in response to the zero crossing signal from the interrupt controller 52.

The adaptive rule program stored in the memory 40 functions to adapt the actual speed of the motor 10 to a reference model which is mathematically set on the basis of the speed characteristic of the motor 10, so as to control the speed of the motor 10.

On the other hand, for transmission of the phase angle control signal of logical "1" bits, it is common that the I/0 port 58 and the second timer 54b are interconnected through an OR gate to each other. This OR gate interconnection may be made in the inside or the outside of the microcomputer according to the type of the microcomputer 50. The external interconnection is performed in a microcomputer incapable of internally processing.

The operation of the single phase induction motor control apparatus with the above-mentioned construction in accordance with the present invention will hereinafter be described in detail.

Upon application of power, the microcomputer 50 receives the interrupt signal from the position detecting circuit 30 at the initial state and then performs the interrupt service routine in response to the received interrupt signal.

Also, the motor 10 is driven at a desired reference speed which is set by the user or set suitably to a given environment by an internal program. At this time, the position detecting circuit 30 applies the pulses resulting from the rotation of the motor 10 to the interrupt controller 52, thereby causing the interrupt controller 52 to perform the interrupt service routine to count one for every pulse.

In the interrupt service routine, when the counted value is N (the predetermined number of the pulses per one rotation), the interrupt controller 52 informs the first timer 54a of one rotation of the motor 10. Here, the rotation of the motor 10 may be sensed by a hall sensor (not shown). Namely, the N pulses per rotation of the motor 10 correspond to the number of magnets on a shaft of the motor 10 which are sensed by the hall sensor.

Then, the first timer 54a detects the time per rotation and outputs the detected time to the CPU 56. The CPU 56 calculates the rotation speed of the motor 10 on the basis of the time per rotation from the first timer 54a. Thereafter, the CPU 56 performs the adaptive process of the calculated speed on the basis of the adaptive rule program stored in the memory 40, so as to generate the motor control signal for compensation for a difference between the actual speed and the desired reference speed.

The second timer 54b converts the motor control signal from the CPU 56 into the count resulting from its internal frequency and outputs the phase ankle control signal of logical "1" bits by the count through the I/O port 58 to the driving circuit 60 in response to the zero crossing signal from the interrupt controller 52.

Noticeably, the transmission of the phase angle control signal through the I/O port 58 to the driving circuit 60 is performed under the influence of the interrupt service routine. Namely, the phase angle control signal is transmitted through the I/O port 58 to the driving circuit 60 when the interrupt signal from the AC zero crossing detecting circuit 20 is applied to the interrupt controller 52. This transmission manner is enabled by the internal program. Also, some of the microcomputers may require a simple circuit disposed at the front stage of the driving circuit.

In other words, the interrupt signal generated every 120 Hz causes a delay time by a phase angle calculated in the adaptive control manner to be transmitted to the second timer 54b for a determination about whether or not the counted signal or the phase angle control signal is transmitted. The microcomputer 50 performs the above operation repeatedly every 120 Hz to transmit the phase angle control signal.

Figure 4:
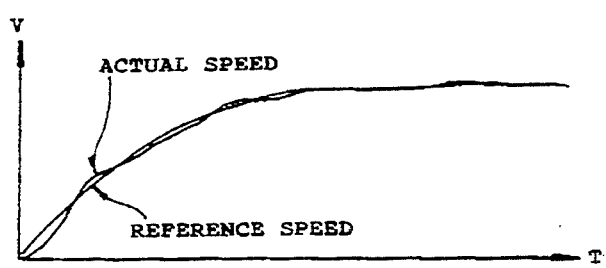
FIG. 4 is a waveform diagram illustrating the relationship between an actual rotation speed of the single phase induction motor and a reference model in accordance with the present invention.

Therefore, the overshoot at the start of the motor 10 and the error at a steady state thereof can be minimized, resulting in the output of a smooth speed at a transient state, as shown in FIG. 4.

Figure 2:
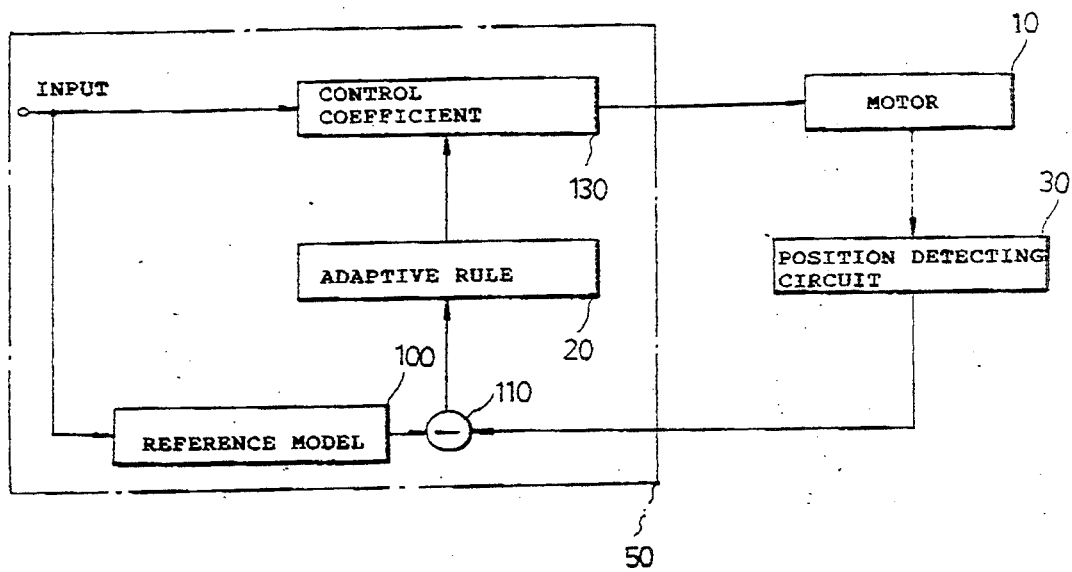
FIG. 2 is a block diagram conceptually illustrating the adaptive control principle of the single phase induction in accordance with the present invention.

Referring to FIG. 2, there is shown a block diagram conceptually illustrating the adaptive control principle of the single phase induction motor in accordance with the present invention. In this drawing, a reference model 100 is to mathematically set to an ideal transfer function equal or analogous to that of the motor 10. As the motor 10 is controlled, an ideal position or rotation signal from the reference model 100 is compared with the position or rotation signal detected by the position detecting circuit 30 in a comparator 110. The resultant error or speed difference from the comparator 110 is converted on the basis of an adaptive rule 120 into a control coefficient 130 which is a fundamental factor of controlling the motor 10.

Referring to FIG. 3, there is shown a flowchart illustrating a method of controlling the single phase induction motor in accordance with the present invention. As shown in this drawing, the single phase induction motor control method of the present invention comprises the interrupt designating step S301 of designating an interrupt vector to perform the interrupt service routine in response to the interrupt signal from the position detecting circuit 30 after the initializing step S300. This is followed by the reference speed inputting step S302 of inputting the desired reference speed which is set by the user or set suitably to the given environment by the internal program. Next, the motor driving step S303 of driving the motor at the desired reference speed inputted at the reference speed inputting step S302 is provided. The motor rotation discriminating step S304 then is provided for discriminating in response to the interrupt signal from the position detecting circuit 30 and through the interrupt service routine whether the motor is rotated one time at the motor driving step S303. The speed discriminating step S305 is then provided for detecting the time per rotation at the motor rotation discriminating step S304. The rotation speed of the motor is detected on the basis of the detected rotation time and storing the detected speed. The speed comparing step S306 is then provided for comparing the speed stored at the speed discriminating step S305 with the reference speed to obtain a difference therebetween. The control coefficient obtaining step S307 is then provided for obtaining the control coefficient for compensation for the speed difference obtained at the speed comparing step S306. Then, the motor control step S308 of is provided for controlling the motor on the basis of the control coefficient obtained at the control coefficient obtaining step S307.

In operation, the microcomputer 50 is initialized at the initializing step S300. At the interrupt designating step S301, the interrupt vector is designated so that the interrupt service routine can be performed in response to the interrupt signal from the position detecting circuit 30. At the motor driving step 8303, the motor 10 is driven at the desired reference speed inputted at the reference speed inputting step S302.

Then, at the motor rotation discriminating step S304, as the motor 10 is driven, the position detecting circuit 30 applies the pulses resulting from the rotation of the motor 10 to the interrupt controller 82, thereby causing the interrupt controller 52 to perform the interrupt service routine to count one for every pulse. In the interrupt service routine, when the counted value is N (the predetermined number of the pulses per one rotation), the interrupt controller 52 informs the first timer 54a of one rotation of the motor 10.

At the speed discriminating step S305, the time per rotation at the motor rotation discriminating step S304 is detected, the rotation speed of the motor being detected on the basis of the detected rotation time and the detected speed is stored. The speed stored at the speed discriminating step S305 is compared with the reference speed at the speed comparing step S306 to obtain the difference therebetween. Then, the control coefficient is obtained at the control coefficient obtaining step S307 for compensation for the speed difference obtained at the speed comparing step S306. Namely, as mentioned above, the second timer 54b converts the motor control signal from the CPU 56 into the count resulting from its internal frequency and outputs the phase angle control signal of logical "1" bits by the count through the I/O port 58 to the driving circuit 60 in response to the zero crossing signal from the interrupt controller 52.

Subsequently, the motor 10 is controlled at the motor control step S308 on the basis of the control coefficient obtained at the control coefficient obtaining step S307. At this time, the transmission of the phase angle control signal through the I/O port 58 to the driving circuit 60 is performed under the influence of the interrupt service routine. Namely, the phase angle control signal is transmitted through the I/O port 58 to the driving circuit 60 when the interrupt signal from the AC zero crossing detecting circuit 20 is applied to the interrupt controller 52. This transmission manner is enabled by the internal pro,ram. Also, some of the microcomputers may require a simple circuit disposed at the front state of the driving circuit.

In other words, the interrupt signal generated every 120 Hz causes a delay time by a phase angle calculated in the adaptive control manner to be transmitted to the second timer 54b for determination about whether or not the counted signal or the phase angle control signal is transmitted. The microcomputer 50 performs the above operation repeatedly every 120 Hz to transmit the phase angle control signal.

Therefore, the overshoot at the start of the motor 10 and the error at the steady state thereof can be minimized, resulting in the output of the smooth speed at a transient state, as shown in FIG. 4.

In order to perform the adaptive control in accordance with the present invention, the ideal reference model 100 must be set as shown in FIG. 2. It should be noted herein that it is necessary to model the motor since the reference model 100 must have the transfer function analogous to that of the motor.

The modeling of the motor must be performed as follows.

First, check the time that the rotation speed of the motor reaches the highest speed under the condition of applying 120 V or 220 V.

Second, check the time that the rotation speed of the motor reaches 63% of the highest speed, which can be expressed by the following equation:

$$G(s) = b/(s + \tau^{-1}) \tag{3-1}$$

where, b is a random constant t and is a time constant which can readily be obtained by checking the number of the pulses from the hall sensor as the position detecting circuit.

Third, differentiate the above equation (3-1).

$$(d/dt)yd(t) + \tau^{-1} \times yd(t) = b \cdot U \tag{3-2}$$

where, U is an input voltage of 120 V or 220 V.

Then, the random constant b can be obtained by substituting yd with 0 at the initial t=0 and with an arrival speed at the final t=20, where yd is the desired speed. Here, it can be seen that the modeling equation simply obtained on the basis of the time constant and the rated speed of the motor. Therefore, the modeling of the motor can simply be performed with only the specification of the motor. On the other hand, with the specification of the motor unknown, the modeling of the motor is readily established by checking the time that the rotation speed of the motor reaches the highest speed.

Assume that the modeling equation is the equation (3-1). In this case, the modeling equation can be z-transformed as follows:

$$G(z) = bz/(z - e - \tau^{-1}dt) = yd(z)/U \tag{3-3}$$

where, dt is time per rotation.

Noticeably, in this system, there is no sampling period and the time per one rotation and the time per half rotation are different. For this reason, dt is defined as time per rotation in this case, whereas it is replaced by the sampling period T in a general case. Also, a settling time of the system can be adjusted by adjusting the time constant of the reference time varying model. The equation (3-3) can be rearranged with respect to yd as follows:

$$yd(k) = e - \tau^{-1}dt \cdot yd(k-1) + b \cdot U \tag{3-4}$$

In the above equation (3-4), the highest speed of the time varying model is outputted when U is 120. The desired final speed can be reduced by reducing U proportionally.

The control input to the motor is obtained by multiplying the control coefficient Kc by the reference input U. The adaptive rule must be defined as the following equation (3-5) so that a variation of the error with Kc is in proportion to a variation of Kc with time:

$$dKc/dt = -K \cdot Err \cdot dErr/dKc \qquad (3-5)$$

where, K is an adaptive gain and Err=yd−yp.

As hereinbefore described, according to the present invention, the single phase induction motor is controlled in such an adaptive control manner as to set the ideal transfer function analogous to that of the motor mathematically as the reference model and then allow the position or speed of the motor to follow the reference model. Therefore, the overshoot at the start of the motor and the error at the steady state thereof can be minimized, resulting in the output of the smooth speed at the transient state.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a single phase induction motor, comprising the steps of:
    calculating an error between an ideal position signal from a reference model and an actual position signal of the motor detected by a position detecting circuit as the motor is controlled;
    converting the calculated error into a control coefficient using an adaptive control program so as to set the control coefficient such that the error between the ideal position signal and the actual position signal is zero;
    controlling the motor according to the control coefficient; and
    wherein said step of calculating an error comprises the steps of:
        inputting a desired reference speed;
        driving the motor at the desired reference speed input at the reference speed inputting step:
        discriminating whether the motor is rotated at the motor driving step;
        detecting time per rotation at the motor rotation discriminating step;
        detecting a rotation speed of the motor on the basis of the detected time per rotation and storing the detected speed; and
        comparing the speed stored at the speed detecting step with the reference speed to obtain a difference therebetween.

2. A method of controlling a single phase induction motor, as set forth in claim 1, wherein the reference model is to mathematically set to an ideal transfer function analogous to that of the motor.

3. A method of controlling a single phase induction motor, as set forth in claim 1 or claim 2, wherein the step of calculating the error further comprising the step of designating an interrupt vector to perform an interrupt service routine in response to an interrupt signal from a position detecting circuit,
    wherein said discriminating step for discriminating whether the motor is rotated at the motor driving step is performed in response to the interrupt signal from said position detecting circuit and through the interrupt service routine.

4. A method of controlling a single phase induction motor, as set forth in claim 3, wherein the method is performed by a microcomputer and the step of calculating the error further comprises, before the step of designating, the step of initializating the microcomputer.

5. A method of controlling a single phase induction motor, as set forth in claim 3, wherein the step of convening the error comprises the steps of:
    obtaining the control coefficient for compensation for the speed difference obtained at the speed comparing step; and
    controlling the motor on the basis of the control coefficient obtained at the control coefficient obtaining step.

6. An apparatus for controlling a single phase induction motor, comprising:
    AC zero crossing detecting means for detecting a crossing point of an AC voltage being applied to the motor;
    position detecting means for detecting a rotation of the motor;
    storage means for storing an adaptive rule program based on a speed characteristic of the motor;
    control means for calculating a rotation speed of the motor in response to output signals from said AC zero crossing detecting means and position detecting means and generating a phase angle control signal according to the calculated speed and the adaptive rule program stored in said storage means; and
    driving means for controlling the rotation speed of the motor in response to the phase angle control signal from said control means.

7. An apparatus for controlling a single phase induction motor as set forth in claim 6, wherein said control means comprises:
    an interrupt controller interrupted in response to the output signal from said AC zero crossing detecting means for outputting a zero crossing signal and interrupted in response to the output signal from said position detecting means for performing an interrupt service routine to count the output signal from said position detecting means and then output a desired signal when the counted value reaches a predetermined number;
    a first timer for outputting rotation time of the motor in response to the desired signal from said interrupt controller;
    a CPU for calculating the rotation speed of the motor on the basis of the rotation time from said first timer and generating a motor control signal by performing an adaptive process of the calculated speed on the basis of the adaptive rule program stored in said storage means to compensate for a difference between an actual speed and a desired reference speed; and
    a second timer for converting the motor control signal from said CPU into a count and outputting the phase angle control signal of logical "1" bits by the count through an I/O port to said driving means in response to the zero crossing signal from said interrupt controller.

8. An apparatus for controlling a single phase induction motor, as set forth in claim 6 or claim 7, wherein the adaptive rule program stored in said storage means functions to adapt the actual speed of the motor to a reference model which is mathematically set on the basis of the speed characteristic of the motor, so as to control the speed of the motor.

* * * * *